United States Patent
Todd et al.

(10) Patent No.: US 8,082,992 B2
(45) Date of Patent: Dec. 27, 2011

(54) METHODS OF FLUID-CONTROLLED GEOMETRY STIMULATION

(75) Inventors: Bradley L. Todd, Duncan, OK (US); David E. McMechan, Duncan, OK (US); Ki Cherryl Whitt, legal representative, Norman, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 274 days.

(21) Appl. No.: 12/501,814

(22) Filed: Jul. 13, 2009

(65) Prior Publication Data

US 2011/0005753 A1 Jan. 13, 2011

(51) Int. Cl.
*E21B 43/267* (2006.01)

(52) U.S. Cl. .................. 166/250.1; 166/280.1; 166/281; 166/308.1

(58) Field of Classification Search .................. None
See application file for complete search history.

(56) References Cited

U.S. PATENT DOCUMENTS

| | | | |
|---|---|---|---|
| 2,238,671 A | 4/1941 | Woodhouse | |
| 2,703,316 A | 3/1955 | Palmer | |
| 3,173,484 A | 3/1965 | Huitt et al. | |
| 3,195,635 A | 7/1965 | Fast | |
| 3,272,650 A | 9/1966 | MacVittie | |
| 3,302,719 A | 2/1967 | Fischer | |
| 3,364,995 A | 1/1968 | Atkins et al. | |
| 3,366,178 A | 1/1968 | Malone et al. | |
| 3,455,390 A | 7/1969 | Gallus | |
| 3,784,585 A | 1/1974 | Schmitt et al. | |
| 3,819,525 A | 6/1974 | Hattenbrun | |
| 3,828,854 A | 8/1974 | Templeton et al. | |
| 3,836,465 A | 9/1974 | Rhudy et al. | |
| 3,868,998 A | 3/1975 | Lybarger et al. | |
| 3,912,692 A | 10/1975 | Casey et al. | |
| 3,948,672 A | 4/1976 | Harnsberger | |
| 3,955,993 A | 5/1976 | Curtice | |
| 3,960,736 A | 6/1976 | Free et al. | |
| 3,968,840 A | 7/1976 | Tate | |
| 3,986,355 A | 10/1976 | Klaeger | |
| 3,998,272 A | 12/1976 | Maly | |

(Continued)

FOREIGN PATENT DOCUMENTS

EP 0 510 762 10/1992

(Continued)

OTHER PUBLICATIONS

"Polymer-free fracturing fluid revives shut-in well" by Enzo Pitoni, World Oil, Sep. 1999.

(Continued)

*Primary Examiner* — Zakiya W Bates
(74) *Attorney, Agent, or Firm* — Robert A. Kent; McDermott Will & Emery LLP (57) ABSTRACT

Methods including the steps of selecting a target fracture geometry for a portion of a subterranean formation; selecting a target tip pressure and a target back flow pressure based at least in part on a calculation for the target fracture geometry; selecting a target surface pressure and a target bottom-hole pressure based at least in part on a calculation for the target tip pressure and the target back flow pressure; and introducing a slurry fluid comprising proppant particulates into one or more fractures in the portion of the subterranean formation. The surface pressure corresponds to the target surface pressure, and bottom-hole pressure corresponds to the target bottom-hole pressure.

20 Claims, 4 Drawing Sheets

U.S. PATENT DOCUMENTS

| | | |
|---|---|---|
| 3,998,744 A | 12/1976 | Arnold et al. |
| 4,010,071 A | 3/1977 | Colegrove |
| 4,068,718 A | 1/1978 | Cooke, Jr. et al. |
| 4,169,798 A | 10/1979 | DeMartino |
| 4,172,066 A | 10/1979 | Zweigle et al. |
| 4,261,421 A | 4/1981 | Watanabe |
| 4,265,673 A | 5/1981 | Pace et al. |
| 4,267,887 A | 5/1981 | Watanabe |
| 4,299,825 A | 11/1981 | Lee |
| 4,387,769 A | 6/1983 | Erbstoesser et al. |
| 4,460,052 A | 7/1984 | Gockel |
| 4,470,915 A | 9/1984 | Conway |
| 4,498,995 A | 2/1985 | Gockel |
| 4,502,540 A | 3/1985 | Byham |
| 4,506,734 A | 3/1985 | Nolte |
| 4,521,316 A | 6/1985 | Sikorski |
| 4,526,695 A | 7/1985 | Erbstoesser et al. |
| 4,632,876 A | 12/1986 | Laird et al. |
| 4,694,905 A | 9/1987 | Armbruster |
| 4,715,967 A | 12/1987 | Bellis |
| 4,716,964 A | 1/1988 | Erbstoesser et al. |
| 4,767,706 A | 8/1988 | Levesque |
| 4,772,346 A | 9/1988 | Anderson et al. |
| 4,785,884 A | 11/1988 | Armbruster |
| 4,793,416 A | 12/1988 | Mitchell |
| 4,797,262 A | 1/1989 | Dewitz |
| 4,809,783 A | 3/1989 | Hollenbeck et al. |
| 4,817,721 A | 4/1989 | Pober |
| 4,822,500 A | 4/1989 | Dobson, Jr. et al. |
| 4,829,100 A | 5/1989 | Murphey et al. |
| 4,836,940 A | 6/1989 | Alexander |
| 4,843,118 A | 6/1989 | Lai et al. |
| 4,848,467 A | 7/1989 | Cantu et al. |
| 4,863,980 A | 9/1989 | Cowan et al. |
| 4,886,354 A | 12/1989 | Welch et al. |
| 4,894,231 A | 1/1990 | Moreau et al. |
| 4,957,165 A | 9/1990 | Cantu et al. |
| 4,961,466 A | 10/1990 | Himes et al. |
| 4,986,353 A | 1/1991 | Clark et al. |
| 4,986,354 A | 1/1991 | Cantu et al. |
| 4,986,355 A | 1/1991 | Casad et al. |
| 5,034,139 A | 7/1991 | Reid et al. |
| 5,082,056 A | 1/1992 | Tackett, Jr. |
| 5,142,023 A | 8/1992 | Gruber et al. |
| 5,152,781 A | 10/1992 | Tang et al. |
| 5,161,615 A | 11/1992 | Hutchins et al. |
| 5,203,834 A | 4/1993 | Hutchins et al. |
| 5,213,446 A | 5/1993 | Dovan |
| 5,216,050 A | 6/1993 | Sinclair |
| 5,247,059 A | 9/1993 | Gruber et al. |
| 5,249,628 A | 10/1993 | Surjaatmadja |
| 5,251,697 A | 10/1993 | Shuler |
| 5,295,542 A | 3/1994 | Cole et al. |
| 5,304,620 A | 4/1994 | Holtmyer et al. |
| 5,314,031 A | 5/1994 | Hale et al. |
| 5,325,923 A | 7/1994 | Surjaatmadja et al. |
| 5,330,005 A | 7/1994 | Card et al. |
| 5,359,026 A | 10/1994 | Gruber |
| 5,360,068 A | 11/1994 | Sprunt et al. |
| 5,363,916 A | 11/1994 | Himes et al. |
| 5,373,901 A | 12/1994 | Norman et al. |
| 5,386,874 A | 2/1995 | Laramay et al. |
| 5,396,957 A | 3/1995 | Surjaatmadja et al. |
| 5,402,846 A | 4/1995 | Jennings, Jr. et al. |
| 5,439,055 A | 8/1995 | Card et al. |
| 5,460,226 A | 10/1995 | Lawton et al. |
| 5,464,060 A | 11/1995 | Hale et al. |
| 5,475,080 A | 12/1995 | Gruber et al. |
| 5,484,881 A | 1/1996 | Gruber et al. |
| 5,487,897 A | 1/1996 | Polson et al. |
| 5,492,177 A | 2/1996 | Yeh et al. |
| 5,496,557 A | 3/1996 | Feijen et al. |
| 5,497,830 A | 3/1996 | Boles et al. |
| 5,499,678 A | 3/1996 | Surjaatmadja et al. |
| 5,501,276 A | 3/1996 | Weaver et al. |
| 5,505,787 A | 4/1996 | Yamaguchi |
| 5,512,071 A | 4/1996 | Yam et al. |
| 5,536,807 A | 7/1996 | Gruber et al. |
| 5,555,936 A | 9/1996 | Pirri et al. |
| 5,558,161 A | 9/1996 | Vitthal et al. |
| 5,591,700 A | 1/1997 | Harris et al. |
| 5,594,095 A | 1/1997 | Gruber et al. |
| 5,602,083 A | 2/1997 | Gabrysch et al. |
| 5,604,186 A | 2/1997 | Hunt et al. |
| 5,607,905 A | 3/1997 | Dobson, Jr. et al. |
| 5,613,558 A | 3/1997 | Dillenbeck |
| 5,670,473 A | 9/1997 | Scepanski |
| 5,697,440 A | 12/1997 | Weaver et al. |
| 5,698,322 A | 12/1997 | Tsai et al. |
| 5,723,416 A | 3/1998 | Liao |
| 5,765,642 A | 6/1998 | Surjaatmadja |
| 5,783,527 A | 7/1998 | Dobson, Jr. et al. |
| 5,791,415 A | 8/1998 | Nguyen et al. |
| 5,799,734 A | 9/1998 | Normal et al. |
| 5,833,000 A | 11/1998 | Weaver et al. |
| 5,849,401 A | 12/1998 | El-Afandi et al. |
| 5,853,048 A | 12/1998 | Weaver et al. |
| 5,888,944 A | 3/1999 | Patel |
| 5,893,416 A | 4/1999 | Read |
| 5,908,073 A | 6/1999 | Nguyen et al. |
| 5,916,849 A | 6/1999 | House |
| 5,924,488 A | 7/1999 | Nguyen et al. |
| 5,964,291 A | 10/1999 | Bourne et al. |
| 5,977,030 A | 11/1999 | House |
| 5,979,557 A | 11/1999 | Card et al. |
| 5,996,693 A | 12/1999 | Heathman |
| 6,004,400 A | 12/1999 | Bishop et al. |
| 6,024,170 A | 2/2000 | McCabe et al. |
| 6,028,113 A | 2/2000 | Scepanski |
| 6,047,772 A | 4/2000 | Weaver et al. |
| 6,110,875 A | 8/2000 | Tjon-Joe-Pin et al. |
| 6,114,410 A | 9/2000 | Betzold |
| 6,123,159 A | 9/2000 | Brookey et al. |
| 6,123,965 A | 9/2000 | Jacob et al. |
| 6,131,661 A | 10/2000 | Conner et al. |
| 6,135,987 A | 10/2000 | Tsai et al. |
| 6,143,698 A | 11/2000 | Murphey et al. |
| 6,148,917 A | 11/2000 | Brookey et al. |
| 6,162,766 A | 12/2000 | Muir et al. |
| 6,169,058 B1 | 1/2001 | Le et al. |
| 6,172,011 B1 | 1/2001 | Card et al. |
| 6,189,615 B1 | 2/2001 | Sydansk |
| 6,202,751 B1 | 3/2001 | Chatterji et al. |
| 6,209,643 B1 | 4/2001 | Nguyen et al. |
| 6,209,646 B1 | 4/2001 | Reddy et al. |
| 6,214,773 B1 | 4/2001 | Harris et al. |
| 6,242,390 B1 | 6/2001 | Mitchell et al. |
| 6,260,622 B1 | 7/2001 | Blok et al. |
| 6,291,013 B1 | 9/2001 | Gibson et al. |
| 6,300,286 B1 | 10/2001 | Dobson, Jr. et al. |
| 6,302,209 B1 | 10/2001 | Thompson et al. |
| 6,308,788 B1 | 10/2001 | Patel et al. |
| 6,311,773 B1 | 11/2001 | Todd et al. |
| 6,323,307 B1 | 11/2001 | Bigg et al. |
| 6,326,458 B1 | 12/2001 | Gruber et al. |
| 6,328,105 B1 | 12/2001 | Betzold |
| 6,330,917 B2 | 12/2001 | Chatterji et al. |
| 6,357,527 B1 | 3/2002 | Norman et al. |
| 6,364,945 B1 | 4/2002 | Chatterji et al. |
| 6,380,138 B1 | 4/2002 | Ischy et al. |
| 6,387,986 B1 | 5/2002 | Moradi-Araghi et al. |
| 6,390,195 B1 | 5/2002 | Nguyen et al. |
| 6,394,185 B1 | 5/2002 | Constien |
| 6,422,314 B1 | 7/2002 | Todd et al. |
| 6,422,326 B1 | 7/2002 | Brookey et al. |
| 6,432,155 B1 | 8/2002 | Swazey et al. |
| 6,454,003 B1 | 9/2002 | Chang et al. |
| 6,476,169 B1 | 11/2002 | Eoff et al. |
| 6,485,947 B1 | 11/2002 | Rajgarhia et al. |
| 6,488,763 B2 | 12/2002 | Brothers et al. |
| 6,494,263 B2 | 12/2002 | Todd |
| 6,508,305 B1 | 1/2003 | Brannon et al. |
| 6,509,301 B1 | 1/2003 | Vollmer et al. |
| 6,527,051 B1 | 3/2003 | Reddy et al. |
| 6,554,071 B1 | 4/2003 | Reddy et al. |
| 6,566,310 B2 | 5/2003 | Chan |
| 6,569,814 B1 | 5/2003 | Brady et al. |

| Patent No. | Date | Inventor |
|---|---|---|
| 6,578,630 B2 | 6/2003 | Simpson et al. |
| 6,599,863 B1 | 7/2003 | Palmer et al. |
| 6,667,279 B1 | 12/2003 | Hessert et al. |
| 6,669,771 B2 | 12/2003 | Tokiwa et al. |
| 6,681,856 B1 | 1/2004 | Chatterji et al. |
| 6,686,328 B1 | 2/2004 | Binder |
| 6,691,780 B2 | 2/2004 | Nguyen et al. |
| 6,702,023 B1 | 3/2004 | Harris et al. |
| 6,710,019 B1 | 3/2004 | Sawdon et al. |
| 6,716,797 B2 | 4/2004 | Brookey |
| 6,737,385 B2 | 5/2004 | Todd et al. |
| 6,749,022 B1 * | 6/2004 | Fredd .................. 166/250.1 |
| 6,761,218 B2 | 7/2004 | Nguyen et al. |
| 6,763,888 B1 | 7/2004 | Harris et al. |
| 6,764,981 B1 | 7/2004 | Eoff et al. |
| 6,770,293 B2 | 8/2004 | Angel et al. |
| 6,793,018 B2 | 9/2004 | Dawson et al. |
| 6,793,730 B2 | 9/2004 | Reddy et al. |
| 6,806,235 B1 | 10/2004 | Mueller et al. |
| 6,817,414 B2 | 11/2004 | Lee |
| 6,818,594 B1 | 11/2004 | Freeman et al. |
| 6,828,280 B2 | 12/2004 | England et al. |
| 6,837,309 B2 | 1/2005 | Boney et al. |
| 6,840,318 B2 | 1/2005 | Lee et al. |
| 6,852,173 B2 | 2/2005 | Banerjee et al. |
| 6,861,394 B2 | 3/2005 | Ballard et al. |
| 6,877,563 B2 | 4/2005 | Todd et al. |
| 6,883,608 B2 | 4/2005 | Parlar et al. |
| 6,886,635 B2 | 5/2005 | Hossaini et al. |
| 6,896,058 B2 | 5/2005 | Munoz, Jr. et al. |
| 6,904,971 B2 | 6/2005 | Brothers et al. |
| 6,938,693 B2 | 9/2005 | Boney et al. |
| 6,949,491 B2 | 9/2005 | Cooke, Jr. |
| 6,953,090 B2 | 10/2005 | Vijn et al. |
| 6,959,767 B2 | 11/2005 | Horton et al. |
| 6,971,448 B2 | 12/2005 | Slabaugh et al. |
| 6,978,838 B2 | 12/2005 | Parlar et al. |
| 6,981,552 B2 | 1/2006 | Reddy et al. |
| 6,983,798 B2 | 1/2006 | Todd |
| 6,983,801 B2 | 1/2006 | Dawson et al. |
| 6,987,083 B2 | 1/2006 | Phillippi et al. |
| 6,994,166 B2 | 2/2006 | Huang et al. |
| 6,997,259 B2 | 2/2006 | Nguyen |
| 7,000,701 B2 | 2/2006 | Todd et al. |
| 7,007,752 B2 | 3/2006 | Reddy et al. |
| 7,021,377 B2 | 4/2006 | Todd et al. |
| 7,032,663 B2 | 4/2006 | Nguyen |
| 7,036,586 B2 | 5/2006 | Roddy et al. |
| 7,036,587 B2 | 5/2006 | Munoz, Jr. et al. |
| 7,036,588 B2 | 5/2006 | Munoz, Jr. et al. |
| 7,044,220 B2 | 5/2006 | Nguyen et al. |
| 7,044,224 B2 | 5/2006 | Nguyen |
| 7,049,272 B2 | 5/2006 | Sinclair et al. |
| 7,063,151 B2 | 6/2006 | Nguyen et al. |
| 7,066,258 B2 | 6/2006 | Justus et al. |
| 7,066,260 B2 | 6/2006 | Sullivan et al. |
| 7,069,994 B2 | 7/2006 | Cooke, Jr. |
| 7,080,688 B2 | 7/2006 | Todd et al. |
| 7,093,658 B2 | 8/2006 | Chatterji et al. |
| 7,093,664 B2 | 8/2006 | Todd et al. |
| 7,096,947 B2 | 8/2006 | Todd et al. |
| 7,101,829 B2 | 9/2006 | Guichard et al. |
| 7,117,942 B2 | 10/2006 | Dalrymple et al. |
| 7,131,491 B2 | 11/2006 | Blauch et al. |
| 7,132,389 B2 | 11/2006 | Lee |
| 7,140,438 B2 | 11/2006 | Frost et al. |
| 7,147,067 B2 | 12/2006 | Getzlaf et al. |
| 7,151,077 B2 | 12/2006 | Prud'homme et al. |
| 7,153,902 B2 | 12/2006 | Altes et al. |
| 7,156,174 B2 | 1/2007 | Roddy et al. |
| 7,165,617 B2 | 1/2007 | Lord et al. |
| 7,166,560 B2 | 1/2007 | Still et al. |
| 7,168,489 B2 | 1/2007 | Frost et al. |
| 7,172,022 B2 | 2/2007 | Reddy et al. |
| 7,178,594 B2 | 2/2007 | Patel |
| 7,178,596 B2 | 2/2007 | Blauch et al. |
| 7,195,068 B2 | 3/2007 | Todd |
| 7,204,311 B2 | 4/2007 | Welton et al. |
| 7,204,312 B2 | 4/2007 | Roddy et al. |
| 7,205,264 B2 | 4/2007 | Boles |
| 7,211,548 B2 | 5/2007 | Munoz, Jr. et al. |
| 7,216,705 B2 | 5/2007 | Saini et al. |
| 7,219,731 B2 | 5/2007 | Sullivan |
| 7,228,904 B2 | 6/2007 | Todd et al. |
| 7,256,159 B2 | 8/2007 | Guichard et al. |
| 7,261,156 B2 | 8/2007 | Nguyen et al. |
| 7,264,051 B2 | 9/2007 | Nguyen et al. |
| 7,265,079 B2 | 9/2007 | Wilbert et al. |
| 7,267,170 B2 | 9/2007 | Mang et al. |
| 7,276,466 B2 | 10/2007 | Todd et al. |
| 7,281,583 B2 | 10/2007 | Whitfill et al. |
| 7,299,869 B2 | 11/2007 | Kalman |
| 7,299,876 B2 | 11/2007 | Lord et al. |
| 7,303,014 B2 | 12/2007 | Reddy et al. |
| 7,306,037 B2 | 12/2007 | Nguyen et al. |
| 7,322,412 B2 | 1/2008 | Badalamenti et al. |
| 7,353,876 B2 | 4/2008 | Savery et al. |
| 7,353,879 B2 | 4/2008 | Todd et al. |
| 7,413,017 B2 | 8/2008 | Nguyen et al. |
| 7,419,937 B2 | 9/2008 | Rimmer et al. |
| 7,448,450 B2 | 11/2008 | Luke et al. |
| 7,455,112 B2 | 11/2008 | Moorehead et al. |
| 7,461,697 B2 | 12/2008 | Todd et al. |
| 7,462,581 B2 | 12/2008 | Munoz, Jr. et al. |
| 7,475,728 B2 | 1/2009 | Pauls et al. |
| 7,476,644 B2 | 1/2009 | Cooke, Jr. |
| 7,484,564 B2 | 2/2009 | Welton et al. |
| 7,497,258 B2 | 3/2009 | Savery et al. |
| 7,497,278 B2 | 3/2009 | Schriener et al. |
| 7,501,530 B2 | 3/2009 | Gewehr et al. |
| 7,506,689 B2 | 3/2009 | Surjaatmadja et al. |
| 7,547,665 B2 | 6/2009 | Welton et al. |
| 7,553,800 B2 | 6/2009 | Munoz, Jr. et al. |
| 2001/0016562 A1 | 8/2001 | Muir et al. |
| 2001/0053749 A1 | 12/2001 | Cowan et al. |
| 2003/0130133 A1 | 7/2003 | Vollmer |
| 2003/0147965 A1 | 8/2003 | Bassett et al. |
| 2003/0230407 A1 | 12/2003 | Vijn et al. |
| 2004/0070093 A1 | 4/2004 | Mathiowitz et al. |
| 2004/0170836 A1 | 9/2004 | Bond et al. |
| 2004/0231845 A1 | 11/2004 | Cooke, Jr. |
| 2004/0261996 A1 | 12/2004 | Munoz, Jr. et al. |
| 2005/0028976 A1 | 2/2005 | Nguyen |
| 2005/0034861 A1 | 2/2005 | Saini et al. |
| 2005/0059556 A1 | 3/2005 | Munoz, Jr. et al. |
| 2005/0059557 A1 | 3/2005 | Todd et al. |
| 2005/0130848 A1 | 6/2005 | Todd et al. |
| 2005/0161220 A1 | 7/2005 | Todd et al. |
| 2005/0183741 A1 | 8/2005 | Surjaatmadja et al. |
| 2005/0277554 A1 | 12/2005 | Blauch et al. |
| 2006/0032633 A1 | 2/2006 | Nguyen |
| 2006/0046938 A1 | 3/2006 | Harris et al. |
| 2006/0105918 A1 | 5/2006 | Munoz, Jr. et al. |
| 2006/0118300 A1 | 6/2006 | Welton et al. |
| 2006/0169182 A1 | 8/2006 | Todd et al. |
| 2006/0169448 A1 | 8/2006 | Savery et al. |
| 2006/0169450 A1 | 8/2006 | Mang et al. |
| 2006/0169452 A1 | 8/2006 | Savery et al. |
| 2006/0169453 A1 | 8/2006 | Savery et al. |
| 2006/0172893 A1 | 8/2006 | Todd et al. |
| 2006/0172894 A1 | 8/2006 | Mang et al. |
| 2006/0172895 A1 | 8/2006 | Mang et al. |
| 2006/0205608 A1 | 9/2006 | Todd |
| 2006/0234873 A1 | 10/2006 | Ballard |
| 2006/0243449 A1 | 11/2006 | Welton et al. |
| 2006/0254774 A1 | 11/2006 | Saini et al. |
| 2006/0258543 A1 | 11/2006 | Saini |
| 2006/0258544 A1 | 11/2006 | Saini |
| 2006/0276345 A1 | 12/2006 | Todd et al. |
| 2006/0283597 A1 | 12/2006 | Schriener et al. |
| 2007/0042912 A1 | 2/2007 | Welton et al. |
| 2007/0049501 A1 | 3/2007 | Saini et al. |
| 2007/0066492 A1 | 3/2007 | Funkhouser et al. |
| 2007/0066493 A1 | 3/2007 | Funkhouser et al. |
| 2007/0078063 A1 | 4/2007 | Munoz |
| 2007/0078064 A1 | 4/2007 | Munoz, Jr. et al. |
| 2007/0100029 A1 | 5/2007 | Reddy et al. |
| 2007/0238623 A1 | 10/2007 | Saini et al. |

| | | | |
|---|---|---|---|
| 2007/0281868 A1 | 12/2007 | Pauls et al. | |
| 2007/0298977 A1 | 12/2007 | Mang et al. | |
| 2008/0009423 A1 | 1/2008 | Mang et al. | |
| 2008/0026955 A1 | 1/2008 | Munoz et al. | |
| 2008/0026959 A1 | 1/2008 | Munoz et al. | |
| 2008/0026960 A1 | 1/2008 | Munoz et al. | |
| 2008/0027157 A1 | 1/2008 | Munoz, Jr. et al. | |
| 2008/0035338 A1 | 2/2008 | Pauls et al. | |
| 2008/0070810 A1 | 3/2008 | Mang | |
| 2008/0139415 A1 | 6/2008 | Todd et al. | |
| 2008/0169102 A1 | 7/2008 | Carbajal et al. | |
| 2008/0202744 A1* | 8/2008 | Crews et al. | 166/246 |
| 2008/0227672 A1 | 9/2008 | Crews et al. | |
| 2008/0269081 A1 | 10/2008 | Lin et al. | |
| 2009/0062157 A1 | 3/2009 | Munoz et al. | |

FOREIGN PATENT DOCUMENTS

| | | |
|---|---|---|
| EP | 0 879 935 A2 | 11/1998 |
| EP | 0 879 935 A3 | 2/1999 |
| EP | 1 413 710 A1 | 4/2004 |
| GB | 2 412 389 | 3/2004 |
| WO | WO 93/15127 A1 | 8/1993 |
| WO | WO 94/07949 A1 | 4/1994 |
| WO | WO 94/08078 A1 | 4/1994 |
| WO | WO 94/08090 A1 | 4/1994 |
| WO | WO 95/09879 A1 | 4/1995 |
| WO | WO 97/11845 A1 | 4/1997 |
| WO | WO 99/27229 | 6/1999 |
| WO | WO 00/57022 | 9/2000 |
| WO | WO 01/02698 | 1/2001 |
| WO | WO 01/87797 A1 | 11/2001 |
| WO | WO 01/94744 | 12/2001 |
| WO | WO 02/55843 | 1/2002 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 2004/037946 A1 | 5/2004 |
| WO | WO 2004/038176 A1 | 5/2004 |

OTHER PUBLICATIONS

Crystallizing and Drying of PLA, NatureWorks®, 15305 Minnetonka Blvd., Minnetonka, MN 55345, 2005.
3001D product datasheet, 2005.
4060D product datasheet, 2005.
"Modeling Frac-Packs and Fracture Propagation in Poorly Consolidated Sands" by Ruben Juanes and Mukul M. Sharma, The University of Texas at Austin, available at www.pge.utexas.edu/links/sandcontrol.pdf, 2006.
Presentation: "Modeling Frac-Packs and Fracture Propagation in Poorly Consolidated Sands" by Ruben Juanes and Mukul M. Sharma, The University of Texas at Austin, available at www.pge.utexas.edu/links/modeling.pdf, Apr. 17, 2006.
BioVert™ H150 Diverter and Fluid Loss Control Material product brochure, Jul. 2008.
HPHT Filter Press 500ml product brochure, 2008.
Simmons, et al., Poly(phenyllactide): Synthesis, Characterization, and Hydrolytic Degradation, Biomacromolecules, vol. 2, No. 2, 2001 (pp. 658-663), 2001.
Yin, et al., Preparation and Characterization of Substituted Polylactides, American Chemical Society, vol. 32, No. 23, 1999 (pp. 7711-7718), 1999.
Yin, et al., Synthesis and Properties of Polymers Derived form Substituted Lactic Acids, American Chemical Society, Ch. 12, 2001 (pp. 147-159), 2001.
Cantu, et al, Laboratory and Field Evaluation of a Combined Fluid-Loss-Control Additive and Gel Breaker for Fracturing Fluids, SPE 18211, Society of Petroleum Engineers, 1990.
Love, et al, Selectively Placing Many Fractures in Openhole Horizontal Wells Improves Production, SPE 50422, Society of Petroleum Engineers, 1998.
McDaniel, et al, Evolving New Stimulation Process Proves Highly Effective in Level 1 Dual-Lateral Completion, SPE 78697, Society of Petroleum Engineers, 2002.

Albertsson, et al, Aliphatic Polyesters: Systhesis, Properties and Applications, Advances in Polymer Science, vol. 157, Degradable Aliphatic Polyesters, 2002.
Dechy-Cabaret, et al, Controlled Ring-Opening Polymerization of Lactide and Glycolide, American Chemical Society, Chemical Reviews, A-Z, AA-AD, received 2004.
Funkhouser, et al, Synthetic Polymer Fracturing Fluid for High-Temperature Applications, SPE 80236, Society of Petroleum Engineers, 2003.
Chelating Agents, Encyclopedia of Chemical Technology, vol. 5 (764-795), 2001.
Vichaibun, et al, A New Assay for the Enzymatic Degradation of Polylactic Acid, Short Report, ScienceAsia, vol. 29, 2003 (pp. 297-300), 2003.
Halliburton, SurgiFracs$^{SM}$ Service, A Quick and Cost-Effective Method to Help Boost Production From Openhole Horizontal Completions, Halliburton Communications, HO3297, 2002.
Halliburton, Cobra Fracs$^{SM}$ Service, Coiled Tubing Fracturing—Cost-Effective Method for Stimulating Untapped Reserves, HO2319R, Halliburton Energy Services, 2000.
Halliburton, CobraJet Frac$^{SM}$ Service, Cost-effective Technology That Can Help Reduce Cost Per BOE Produced, Shorten Cycle Time and Reduce Capex, Halliburton Communications, Apr. 2003.
Y. Chiang et al., Hydrolysis of Ortho Esters; Further Investigation of the Factors Which Control the Rate-Determining Step, Engineering Information, Inc. NY, NY, vol. 105, No. 23 (XP-002322842), Nov. 16, 1983.
M. Ahmad, et al., Ortho Ester Hydrolysis: Direct Evidence for a Three-Stage Reaction Mechanism, Engineering Information, Inc. NY, NY, vol. 101, No. 10 (XP-002322843) May 9, 1979.
Skrabal et al, The Hydrolysis Rate of Orthoformic Acid Ethyl Ether, Chemical Institute of the University of Graz, Jan. 13, 1921, pp. 1-38, Jan. 13, 1921.
Heller, et al., Poly(ortho esters)—From Concept to Reality, Biomacromolecules, vol. 5, No. 5, 2004 (pp. 1625-1632) May 9, 1979.
Schwach-Abdellaoui, et al., Hydrolysis and Erosion Studies of Autocatalyzed Poly(ortho esters) Containing Lactoyl-Lactyl Acid Dimers, American Chemical Society, vol. 32, No. 2, 1999 (pp. 301-307), 1999.
Ng, et al., Synthesis and Erosion Studies of Self-Catalyzed Poly(ortho ester)s, American Chemical Society, vol. 30, No. 4, 1997 (pp. 770-772), 1997.
Ng, et al., Development of a Poly(ortho ester) prototype With a Latent Acid in the Polymer Backbone for 5-fluorouracil Delivery, Journal of Controlled Release 65 (2000), (pp. 367-374), 2000.
Rothen-Weinhold, et al., Release of BSA from poly(ortho ester) extruded thin strands, Journal of Controlled Release 71, 2001, (pp. 31-37), 2001.
Heller, et al., Poly(ortho ester)s—their development and some recent applications, European Journal of Pharmaceutics and Biopharmaceutics, 50, 2000, (pp. 121-128), 2000.
Heller, et al., Poly(ortho esters); synthesis, characterization, properties and uses, Advanced Drug Delivery Reviews, 54, 2002, (pp. 1015-1039), 2002.
Heller, et al., Poly(ortho esters) for the Pulsed and Continuous Delivery of Peptides and Proteins, Controlled Release and Biomedical Polymers Department, SRI International, (pp. 39-46), 1995.
Zignani, et al., Subconjunctival biocompatibility of a viscous bioerodable poly(ortho ester), J. Biomed Mater Res, 39, 1998, pp. 277-285, 1998.
Toncheva, et al., Use of Block Copolymers of Poly(Ortho Esters) and Poly (Ethylene Glycol), Journal of Drug Targeting, 2003, vol. 11(6), pp. 345-353, 2003.
Schwach-Abdellaoui, et al., Control of Molecular Weight for Auto-Catalyzed Poly(ortho ester) Obtained by Polycondensation Reaction, International Journal of Polymer Anal. Charact., 7: 145-161, 2002, pp. 145-161, 2002.
Heller, et al., Release of Norethindrone from Poly(Ortho Esters), Polymer Engineering and Science, Mid-Aug., 1981, vol. 21, No. 11 (pp. 727-731), 1981.

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603, 1974.

Todd, et al., *A Chemcial "Trigger" Useful for Oilfield Applications*, Society of Petroleum Engineers, Inc., SPE 92709, Feb. 4, 2005.

Kiyoshi Matsuyama et al, Environmentally benign formation of polymeric microspheres by rapid expansion of supercritical carbon dioxide solution with a nonsolvent, Environ Sci Technol 2001, 35, 4149-4155, 2001.

* cited by examiner

METHODS OF FLUID-CONTROLLED GEOMETRY STIMULATION

BACKGROUND

This invention relates to subterranean treatments and, more particularly, in certain embodiments, to methods of stimulating a high-permeability subterranean formation which provide an element of control over fluid leakoff and proppant pack formation.

To increase the production of desirable fluids, subterranean wells (such as hydrocarbon producing wells, water producing wells, and injection wells) may be stimulated by traditional hydraulic-fracturing treatments. In traditional hydraulic-fracturing treatments, a viscous fracturing fluid is pumped into a portion of a subterranean formation at or above a rate and pressure sufficient to create or enhance one or more fractures in the formation. It should be understood that there is growing evidence that stimulation by hydraulic fracturing in unconsolidated or poorly consolidated formations may not produce brittle fractures (macroscopic cracks or fissures), as would be expected in more consolidated formations. Rather, a region of high permeability may form, due, in part, to shear failure near the tip of the would-be fracture. To the extent that the methods disclosed herein are applicable to both brittle fractures and regions of high permeability produced by hydraulic-fracturing treatments, the term "fracture" will be used to generally describe the immediate physical results of hydraulic fracturing stimulation of a subterranean formation.

During traditional hydraulic-fracturing treatments, particulate solids, such as graded sand, may be suspended in a portion of the fracturing fluid and deposited in the fractures. These particulate solids, or "proppant particulates," serve to prevent the fractures from fully closing once the hydraulic pressure is released. By preventing the fractures from fully closing, the proppant particulates aid in forming channels through which fluids may flow. In some instances, fracturing and gravel-packing treatments may be combined into a single treatment, often referred to as a "frac pac" treatment. In gravel packing treatments, larger particulate solids (commonly referred to as "gravel particulates") may be suspended in a fluid for delivery to a desired area in a well bore, e.g., near unconsolidated or weakly consolidated formation zones, to form a gravel pack to enhance sand control. One common type of gravel-packing treatment involves placing a sand-control screen in the well bore and packing the annulus between the screen and the well bore with the gravel particulates of a specific size designed to prevent the passage of formation sand. The gravel particulates act, among other things, to prevent the formation particulates from occluding the screen or migrating with the produced hydrocarbons, and the screen acts, among other things, to prevent the particulates from entering the production tubing.

The downhole pressure needed to create or enhance one or more fractures in a subterranean formation is a function of the hydrostatic pressure (e.g., the weight of the hydrostatic column) and the surface pressure, provided by the pumping equipment, less the frictional pressure losses due, in part, to the tubing and other downhole equipment as the fracturing fluid passes therethrough. Due to the volume of fluids and proppant required in typical fracturing and frac pac treatments, supply vessels may be required. However, access to the requisite vessels may not be possible in certain locations, particularly internationally. Conventional gravel packing and cementing equipment may be available at these locations, but the size of the jobs typically precludes use of the gravel packing and cementing equipment.

SUMMARY

This invention relates to subterranean treatments and, more particularly, in certain embodiments, to methods of stimulating a high-permeability subterranean formation which provide an element of control over fluid leakoff and proppant-pack formation.

One embodiment of the present invention provides a method for stimulating a high-permeability subterranean formation. The method comprises selecting a target fracture geometry for a portion of a subterranean formation. The method further comprises introducing a pad fluid comprising a fluid-loss-control additive into the portion of the subterranean formation to create or extend one or more fractures in the portion of the subterranean formation, wherein an amount of the fluid-loss-control additive is determined based at least in part on the target fracture geometry. The method further comprises allowing a barrier to form along at least a portion of the one or more fractures, wherein the barrier comprises the fluid-loss-control additive. The method further comprises introducing a slurry fluid comprising proppant particulates into the one or more fractures, wherein a tip screen-out occurs in at least one of the one or more fractures.

In another embodiment, an additional method for stimulating a high-permeability subterranean formation is provided. The method comprises selecting a target fracture geometry for a portion of a subterranean formation. The method further comprises selecting a target tip pressure and a target back flow pressure based at least in part on a calculation for the target fracture geometry. The method further comprises selecting a target surface pressure and a target bottom-hole pressure based at least in part on a calculation for the target tip pressure and the target back flow pressure. The method further comprises introducing a slurry fluid comprising proppant particulates into one or more fractures in the portion of the subterranean formation, wherein surface pressure corresponds to the target surface pressure, and bottom-hole pressure corresponds to the target bottom-hole pressure.

In another embodiment, an additional method for stimulating a high-permeability subterranean formation is provided. The method comprises selecting a target fracture geometry for a portion of a subterranean formation. The method further comprises selecting a target barrier coverage based at least in part on a calculation for the target fracture geometry. The method further comprises selecting target pad fluid parameters based at least in part on a calculation for the target barrier coverage, wherein the target pad fluid parameters comprise a target volume of pad fluid, a target quantity of fluid-loss-control additive within the pad fluid, and a target pumping rate and pressure to pump the pad fluid. The method further comprises introducing a pad fluid into the portion of the subterranean formation, wherein volume of pad fluid, quantity of fluid-loss-control additive within the pad fluid, and pumping rate and pressure to pump the pad fluid correspond to the target pad fluid parameters. The method further comprises selecting target slurry fluid parameters based at least in part on a calculation for the target barrier coverage and target fracture geometry, wherein the target slurry fluid parameters comprise a target volume of slurry fluid, a target quantity of proppant within the slurry fluid, a target viscosity of the slurry fluid, and a target pumping rate and pressure to pump the slurry fluid. The method further comprises introducing a slurry fluid into the portion of the subterranean formation, wherein volume of slurry fluid, quantity of proppant within the slurry fluid, viscosity of the slurry fluid, and pumping rate and pressure to pump the slurry fluid correspond to the target slurry fluid parameters.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

This invention relates to subterranean treatments and, more particularly, in certain embodiments, to methods of stimulating a high-permeability subterranean formation which provide an element of control over fluid leakoff and proppant pack formation. As used herein, a subterranean formation having a high permeability is a formation that has a permeability of at least about 10 millidarcy (>10 md), as determined by core sample analysis or field production or well testing. In some embodiments, the methods of the present invention comprise introducing a pad fluid comprising a fluid-loss-control additive ("FLA") into a subterranean formation so as to create and/or extend one or more fractures into the subterranean formation. As used herein, "pad fluid" generally refers to a fluid pumped at the beginning of a stimulation operation which does not contain proppant. The pad fluid comprising the FLA may form a barrier along the one or more fractures, such that the barrier may impede fracture face leakoff of aqueous fluids from the one or more fractures. Once the barrier is formed along the fracture face, a slurry fluid comprising proppant particulates is introduced into the one or more fractures so that a tip screen-out may occur in at least one of the one or more fractures once the slurry fluid extends beyond the barrier. In some embodiments, the methods of the present invention provide controlled fluid leakoff from a fracture face, which allows for the volume of fluid and the fluid pumping rate and pressure to be substantially less than required by traditional hydraulic-fracturing treatments. It is believed that fluid leakoff controlled under certain embodiments of this invention tends to be much less sensitive to variations in reservoir characteristics (such as permeability and fluid efficiency) than traditional hydraulic-fracturing treatments. Furthermore, due to reduced fluid volume requirements, cementing, and gravel packing equipment available at the site may be used in accordance with certain embodiments of the present invention.

Figure 1:
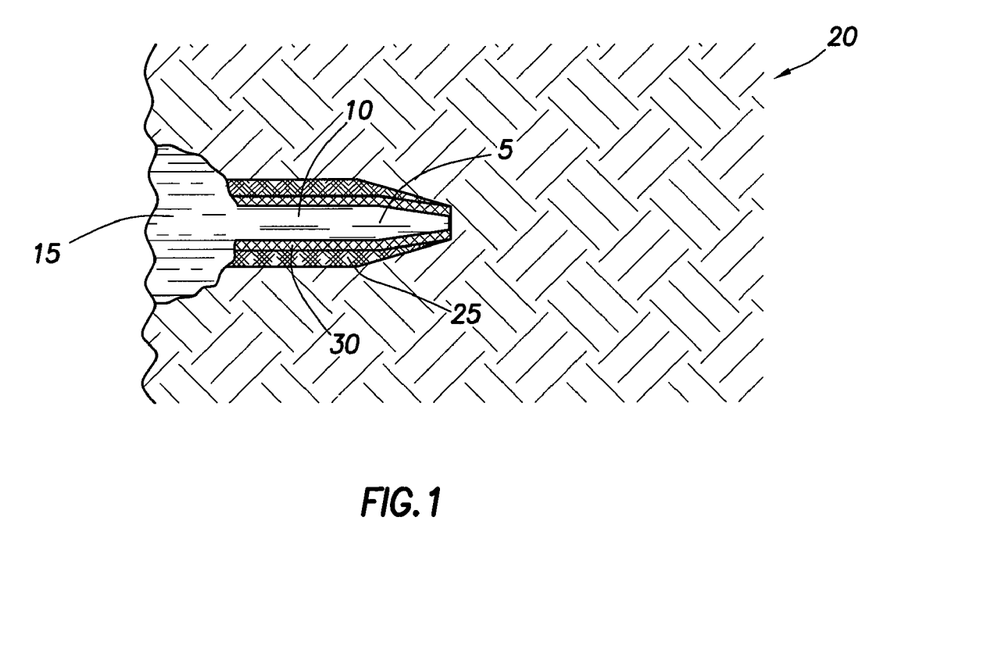
FIG. 1 illustrates initiation of a fracture with a pad fluid in accordance with an aspect of an embodiment of the invention.

An early phase of one embodiment of the invention is illustrated in FIG. 1. As illustrated, pad fluid 5 may be introduced into fracture 10, which emanates from well bore 15 in formation 20. In certain embodiments, formation 20 may be a high-permeability formation. In certain embodiments, formation 20 may be a high-permeability formation with a permeability of about 10 md to about 5 Darcies and, alternatively of about 100 md to about 2 Darcies. It should be understood that fracture 10 may have existed prior to the pumping of pad fluid 5, or fracture 10 may have been created and/or extended by the action of pumping pad fluid 5. Fracture 10 may be a macroscopic, brittle fracture, of the type traditionally associated with hydraulic fracturing. Fracture 10 also may be a microscopic fracture within a region of high permeability in a poorly consolidated formation. The well bore treated may be vertical, deviated, horizontal, multilateral, and or combinations thereof. The well bore may be completed with casing and perforations or open hole.

Pad fluid 5 may exit fracture 10 through fracture face leakoff 25 along the perimeter of fracture 10. As used herein, "fracture face leakoff" refers to fluid migration from the fracture into the formation through the fracture face and not through the tip of the fracture. In the process of exiting fracture 10 as fracture face leakoff 25, the pad fluid 5 generally forms a barrier 30 that is substantially impermeable to the flow of aqueous liquids. The pad fluid generally may be characterized based on the performance of the barrier in the presence of aqueous fluids. For example, a barrier may be formed by a suitable pad fluid wherein, after optional removal of any excess pad fluid, and introduction of an aqueous fluid without FLAs, the barrier may permit post-spurt fluid loss of less than 0.2 gal/ft$^2$/hr, as measured on a 5-micron disc in an HPHT cell with 500 pounds per square inch ("psi") differential pressure at 140° F. As used herein, "spurt" is the leakoff that occurs as the barrier (e.g., filter cake) is being deposited. As used herein, "post-spurt" is the leakoff that occurs after the barrier is in place with the leakoff taking-on a straight-line character when plotted in the square root of time (often referred to as Cw). Generally, barrier 30 may be any coating, caking, agglomeration, or other build-up of FLA which is substantially impermeable to the flow of aqueous liquids. In certain embodiments, the barrier 30 may be a filter cake that is substantially impermeable to aqueous liquid flow. The barrier 30 generally may be formed, for example, on the walls of fracture 10. In some embodiments, the barrier 30 may comprise self-degrading material.

The pad fluid 5 may generally comprise a FLA such that leakoff from the pad fluid is dominated by spurt, and very little time-dependent leakoff follows. It should be understood by one of ordinary skill in the art with the benefit of this disclosure that the amount of barrier surface area generated by such pad fluids may be strongly influenced by the amount of FLA present in the pad fluid. Therefore, the barrier coverage geometry (including length and height of the fracture) may be predicted substantially independent of the permeability and fluid efficiency of the formation, but primarily dependent upon the ability of a given quantity of FLA to cover a certain surface area of fracture face. The type and quantity of FLA in the pad fluid may be optimized so that the leading edge of the fracture reaches the desired fracture length within about 0.5 ft, for example, of the location where the pad volume is depleted, i.e., the end of the barrier.

Figure 2:
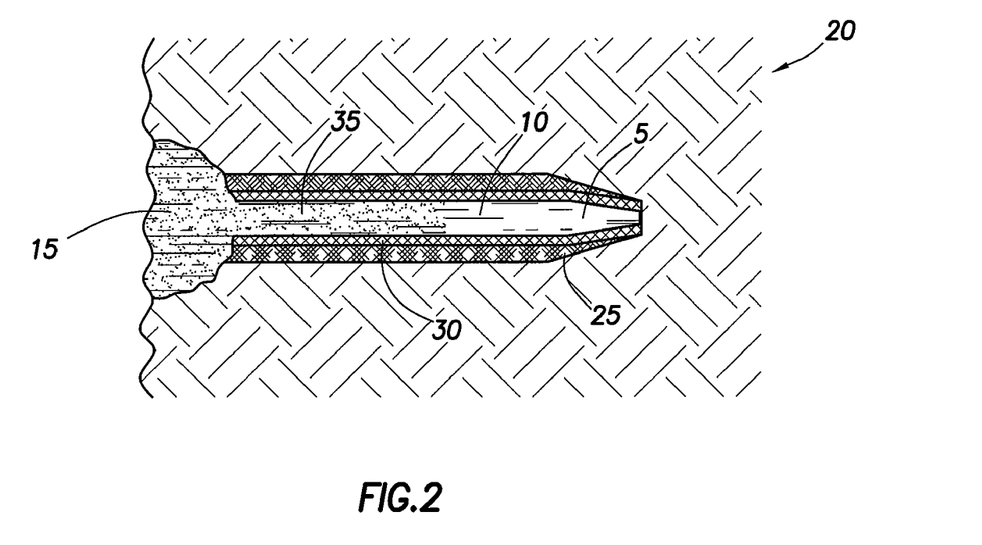
FIG. 2 illustrates extension of the fracture with the pad fluid and introduction of the slurry fluid into the fracture in accordance with an aspect of an embodiment of the invention.

FIG. 2 illustrates extension of fracture 10 with the pad fluid 5 and introduction of slurry fluid 35 into the fracture, in accordance with an aspect of an embodiment of the invention. As illustrated, pad fluid 5 may be introduced into fracture 10 at or above a pressure sufficient to extend fracture 10 into formation 20. In the illustrated embodiments, slurry fluid 35 may be pumped into fracture 10 following pad fluid 5. As those of ordinary skill in the art will appreciate, a spacer fluid may be introduced between pad fluid 5 and slurry fluid 35. Slurry fluid 35 also may be introduced into formation 20 at or above a pressure sufficient to extend fracture 10 into formation. As will be discussed in more detail below, the base fluid of the slurry fluid 35 generally may be a high-leakoff fluid. As used herein, a "high-leakoff fluid" will generally have a fluid loss of more than 10 gal/ft2/hr, as measured on a 5-micron disc in an HPHT cell with 500 psi differential pressure at 140° F. Slurry fluid 35 may generally not contain materials that would contribute to the barrier, and slurry fluid 35 may be designed to have an uncontrolled leakoff. However, even though slurry fluid 35 may be a high-leakoff fluid, since the pad fluid 5 has formed barrier 30 on the walls of the fracture 10, there may be very little fracture face leakoff 25 of slurry fluid 35. Slurry fluid 35 may not disrupt barrier 30 such that barrier 30 remains substantially impermeable to aqueous fluids during introduction of slurry fluid 35 into fracture 10. Likewise, barrier 30 should not substantially self-degrade during introduction of slurry fluid 35 into fracture 10. As additional slurry fluid 35 is pumped into fracture 10, pad fluid 5 may be substantially fully dissipated through fracture face leakoff 25 and formation of barrier 30.

Figure 3:
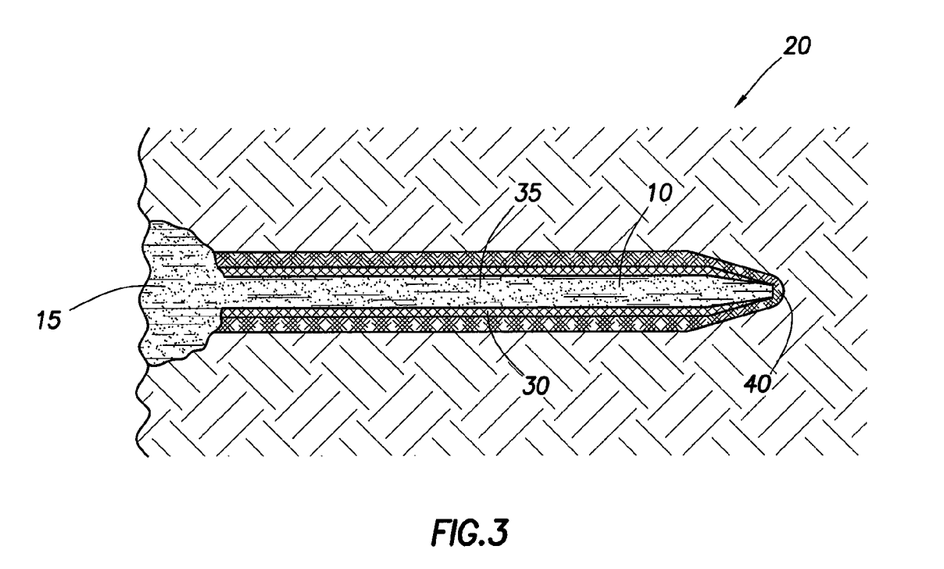
FIG. 3 illustrates introduction of the slurry fluid into the fracture with leakoff through the fracture tip in accordance with an aspect of an embodiment of the invention.

FIG. 3 illustrates introduction of slurry fluid 35 into fracture 10 with tip leakoff 40 through the fracture tip. As previously mentioned, very little leakoff of slurry fluid 35 occurs through the perimeter of fracture 10 because of barrier 30. However, once the length of fracture 10 extends slightly beyond the area covered by barrier 30, leakoff of slurry fluid 35 may then occur substantially through tip leakoff 40 through the tip of fracture 10. The rate of leakoff of slurry fluid occurring substantially through the tip of fracture 10 may be at least about 10 gal/ft$^2$/hr, and, in certain embodiments, as much as about 50 gal/ft$^2$/hr.

Figure 4:
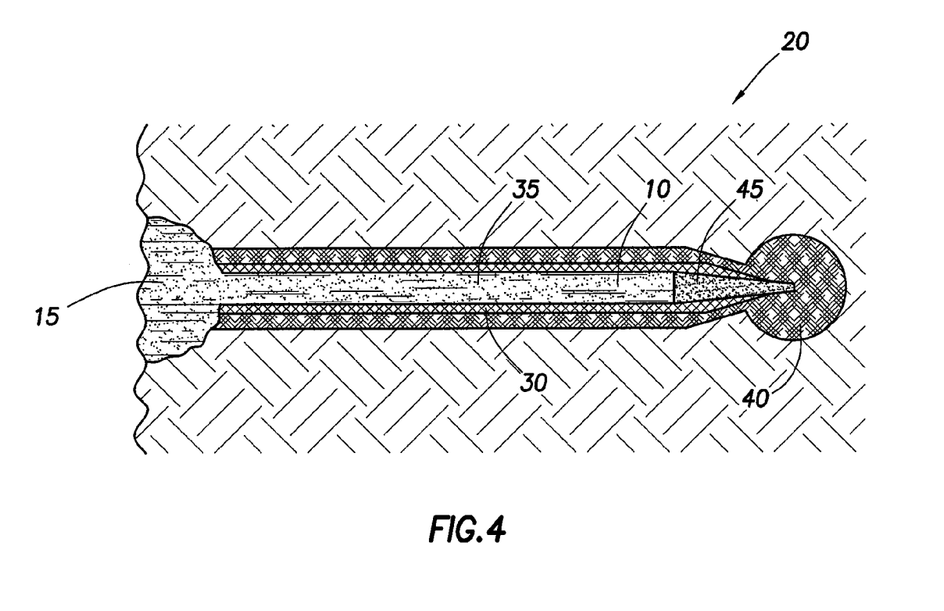
FIG. 4 illustrates an aspect of an embodiment of the invention near the beginning of tip screen-out.

In one embodiment of the invention, illustrated in FIG. 4, leakoff of slurry fluid 35 through tip leakoff 40 may result in tip screen-out ("TSO"). As used herein, "TSO" refers to the phenomena of minimal additional growth in fracture length as proppant particulates agglomerate from the fracture tip towards the well bore. Thus, in FIG. 4, proppant pack 45 may begin to form at the tip of fracture 10. In accordance with embodiments of the present invention, the TSO may occur just beyond the area of fracture 10 covered by barrier 30. By way of example, TSO may occur within about 0.1 feet to about 0.5 feet of the end of barrier 30.

Figure 5:
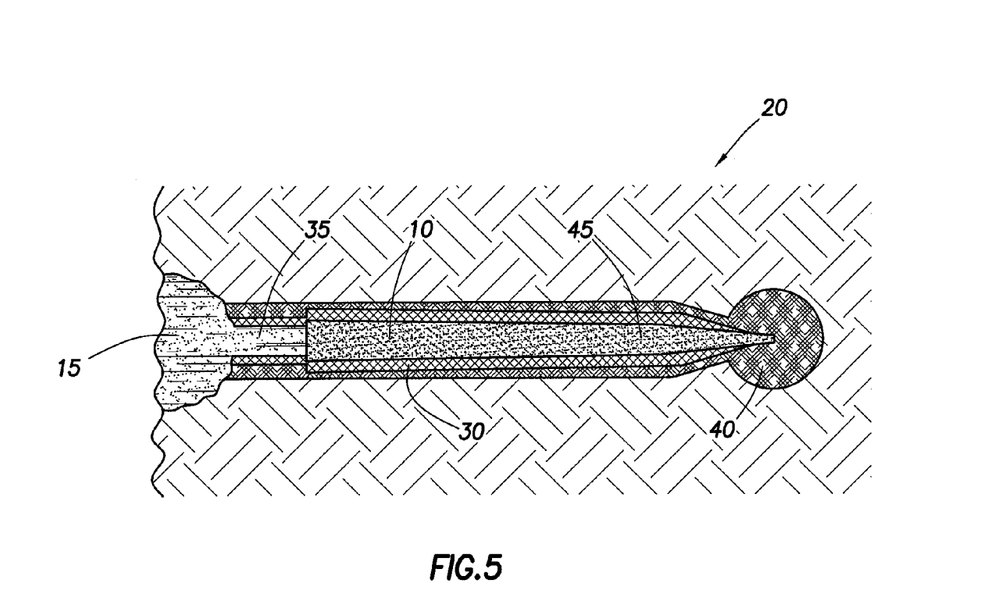
FIG. 5 illustrates an aspect of an embodiment of the invention near the end of tip screen-out.

In accordance with embodiments of the present invention, slurry fluid 35 may continue to leakoff through tip leakoff 40. In one embodiment of the invention, as illustrated in FIG. 5, continued tip leakoff 40 may result in the growth of the proppant pack 45 towards the well bore 15. With the growth of proppant pack 45, the pressure required for slurry fluid 35 to travel through proppant pack 45 to reach the tip of fracture 10 may increase. This increase in pressure may result in an increase in back pressure in the fracture 10, thereby expanding the width of fracture 10 as proppant pack 45 grows. By way of example, the back pressure in the fracture may be between about 10 psi and about 400 psi. It should be understood that this increase in width can be achieved even at relatively low pumping rates and pressures. For example, the pumping rate may be about 5 barrels to about 10 barrels/minute. In certain embodiments, the pumping rate may be adjusted (e.g., lowered) based on the desired back pressure. With the benefit of this disclosure, one of ordinary skill in the art should recognize that a specified fracture width may be achieved while decreasing pumping rates as the proppant pack agglomerates towards the well bore. One of ordinary skill in the art would also recognize that pressure above 400 psi may be desired given certain combination of the modulus of elasticity of the formation and the fracture length (radius), and that the conductivity of the fracture will depend, inter alia, on the formation permeability, the type and size of proppant used, and the amount of near well bore damage that is being bypassed.

Taken together, the barrier coverage geometry, the leading edge of the fracture, the location of TSO, and the width and height of the fracture may define a fracture geometry. As would be understood by one of ordinary skill in the art with the benefit of this disclosure, to control the geometry of fracture 10, the design of the stimulation job to produce a target fracture geometry may specify targets for the volume of pad fluid 5, the quantity of FLA within pad fluid 5, the pumping rate and pressure utilized to pump pad fluid 5, the volume of slurry fluid 35, the quantity of proppant within slurry fluid 35, the viscosity of slurry fluid 35, and the pumping rate and pressure utilized to pump slurry fluid 35. The barrier coverage geometry (including length and height of the fracture) may be primarily dependent upon the ability of a given quantity of FLA to cover a certain surface area of fracture face. The width of the fracture may be predicted primarily by the formation pressure response following TSO. The conductivity of the resulting fracture may be primarily dependent upon the permeability of the formation, the permeability of the proppant, and the width of the fracture.

Figure 6:
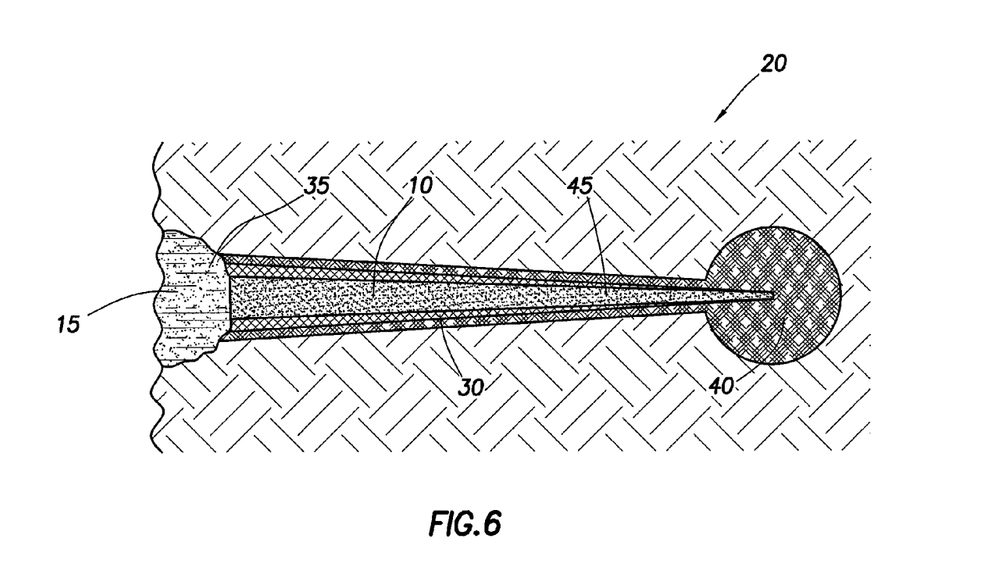
FIG. 6 illustrates an aspect of an embodiment of the invention at the conclusion of tip screen-out.

FIG. 6 illustrates the resultant proppant pack 45 substantially filling widened fracture 10 in accordance with one embodiment of this invention. It should be understood that the treatment phases illustrated in FIGS. 1-6 may or may not be followed by a gravel-packing procedure at the well bore. Although the gravel packing procedure may be performed with a screen in place, the present method encompasses treatments that are done without a screen. Additional treatments which do not undesirably impact the formation of proppant pack 45 may be applied to fracture 30 at any point prior to, during, or following the aforementioned phases. The methods of the present invention optionally may include applying one or more preflush or afterflush fluids to the subterranean formation at any phase of the treatment process. Examples of suitable preflush fluids include, but are not limited to, acids and bases. Examples of suitable afterflush fluids include, but are not limited to, high-pH/caustic solutions. Acidic afterflushes may be particularly appropriate when the pad fluid comprises a FLA which is not self-degrading, such as calcium carbonate.

According to one embodiment of the invention, design of a stimulation job to produce a target fracture geometry may occur prior to introduction of pad fluid 5 into well bore 15. As previously discussed, the design of a stimulation job may specify targets for the volume of pad fluid, the quantity of FLA within the pad fluid, the pumping rate and pressure utilized to the pump pad fluid, the volume of slurry fluid, the quantity of proppant within the slurry fluid, the viscosity of the slurry fluid, and the pumping rate and pressure utilized to pump the slurry fluid. Moreover, the design may establish multiple stages for the pad, each uniquely characterized by type of fluid, volume of fluid, type and quantity of FLA, and/or pumping rates and pressures. Similarly, the design may specify parameters for the slurry fluid and establish multiple stages for the slurry fluid pumping, each uniquely characterized by type of fluid, volume of fluid, type of proppant, proppant concentration, and/or pumping rates and pressures.

Figure 7:
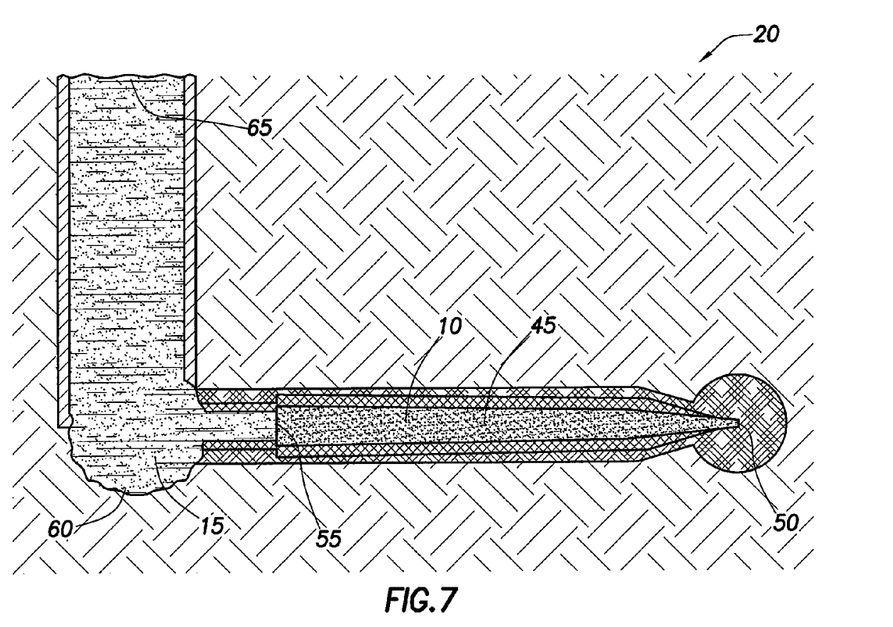
FIG. 7 illustrates aspects of pressure targets and measurement for an embodiment of the invention.

According to one embodiment of the invention, design of a stimulation job may set target pressure parameters. One aspect of such job design may include setting targets for the pressure at the tip of the fracture, element 50 of FIG. 7. It should be appreciated that pressure at the tip 50 subsequent to TSO should remain below fracture extension pressure to minimize the risk of the fracture extending in length, rather than growing the proppant pack while expanding the width of the fracture. Yet another aspect of such job design may be to set target parameters for the back pressure in the fracture, element 55 in FIG. 7. As previously discussed, the back pressure 55 may increase with the growth of the proppant pack, thereby expanding the width of the fracture. Appropriate target parameters for the back pressure 55 in the fracture could provide constraints on the width of the resultant propped fracture. Once target parameters for the pressure at the tip 50 of the fracture and the back pressure 55 in the fracture have been established, standard flow equations may be used to model the formation stimulation job and thereby calculate acceptable measurable parameters, such as the bottom-hole pressure and the surface pressure, elements 60 and 65, respectively, in FIG. 7. While FIG. 7 illustrates a horizontal fracture, it should be understood that the fracture may be vertical, deviated, horizontal, multilateral, and or combinations thereof.

It is believed that the system's inherent simplicity may result in improved operational reliability during treatment. In addition, no preliminary step-rate and injection tests may be required for treatment design. Further, preparation of the fluids may not require polymer hydration time, and crosslinkers or specific internal breakers may not be needed. The reduced complexity of the treatment may not only simplify on-site mixing and metering, but also may increase reliability, as well.

Pad fluids of the present invention generally comprise a base fluid, a viscosifying agent, and a FLA. Optionally, other additives may be added as desired.

The pad fluid may provide a base fluid as a medium of transport for the other components into the formation. The base fluid may comprise water or brine. Selected organic or inorganic salts or mixtures may be included, provided that they do not undesirably interact with other components in the pad, other treatment fluids, the formation, and formation fluids. For example, a base fluid comprising about 1% to about 7% by weight potassium chloride or ammonium chloride may be used as the base fluid in pad fluids to stabilize clays and prevent clay swelling. Sometimes other brines or seawater may be used. An organic cation salt, such as, in particular, tetra methyl ammonium chloride, may be utilized, with a concentration of, for example, but not limited to, about 0.2% to about 0.5% by weight.

The pad fluid may include a FLA such that the filter cake and leakoff control that results is dominated by the spurt, and very little time dependent leakoff follows. By appropriately selecting the FLA, the amount of filter cake surface area generated by the pad fluid may be strongly influenced by the amount of FLA material pumped. Thereby, the resultant fracture geometry may be controlled by specifying the amount of FLA material included in the pad fluid. In general, the FLA may contain, for example, at least one component that can be broken or degraded (for example, oxidation of a polymer, or enzymatic degradation of a cross-linked natural polymer) or dissolved (for example, dissolution of calcium carbonate by an acid, or dissolution of a wax or resin by a solvent). By way of example, this generally may allow removal of the barrier formed by the FLAs subsequent to formation of the proppant pack in the fracture.

In certain embodiments of the present invention, the FLA may comprise a degradable material, such as be a degradable polymer. The terms "degradation" or "degradable" refer to both the two relatively extreme cases of hydrolytic degradation that the degradable material may undergo, e.g., heterogeneous (or bulk erosion) and homogeneous (or surface erosion), and any stage of degradation in between these two. This degradation can be a result of, inter alia, a chemical or thermal reaction, or a reaction induced by radiation. The terms "polymer" or "polymers" as used herein do not imply any particular degree of polymerization; for instance, oligomers are encompassed within this definition.

A polymer is considered to be "degradable" herein if it is capable of undergoing an irreversible degradation when used in an appropriate applications, e.g., in a well bore. The term "irreversible" as used herein means that the degradable material should degrade in situ but should not recrystallize or reconsolidate in situ after degradation.

Suitable examples of degradable polymers that may be used in accordance with the present invention include, but are not limited to, those described in the publication of Advances in Polymer Science, Vol. 157 entitled "Degradable Aliphatic Polyesters," edited by A. C. Albertsson, pages 1-138. Specific examples include homopolymers, random, block, graft, and star- and hyper-branched aliphatic polyesters. Such suitable polymers may be prepared by polycondensation reactions, ring-opening polymerizations, free radical polymerizations, anionic polymerizations, carbocationic polymerizations, coordinative ring-opening polymerizations, as well as by any other suitable process. Examples of suitable degradable polymers that may be used in conjunction with the methods of this invention include, but are not limited to, aliphatic polyesters; poly(lactides); poly(glycolides); poly($\epsilon$-caprolactones); poly(hydroxy ester ethers); poly(hydroxybutyrates); poly(anhydrides); polycarbonates; poly(orthoesters); poly(amino acids); poly(ethylene oxides); poly(phosphazenes); poly ether esters, polyester amides, polyamides, and copolymers or blends of any of these degradable polymers, and derivatives of these degradable polymers. The term "copolymer" as used herein is not limited to the combination of two polymers, but includes any combination of polymers, e.g., terpolymers and the like. As referred to herein, the term "derivative" is defined herein to include any compound that is made from one of the listed compounds, for example, by replacing one atom in the base compound with another atom or group of atoms. Of these suitable polymers, aliphatic polyesters such as poly(lactic acid), poly(anhydrides), poly(orthoesters), and poly(lactide)-co-poly(glycolide) copolymers are preferred. Poly(lactic acid) is especially preferred. Poly(orthoesters) also may be preferred. Other degradable polymers that are subject to hydrolytic degradation also may be suitable. One's choice may depend on the particular application or use and the conditions involved. Other guidelines to consider include the degradation products that result, the time for required for the requisite degree of degradation, and the desired result of the degradation (e.g., voids).

Suitable aliphatic polyesters have the general formula of repeating units shown below:

Formula I where n is an integer between 75 and 10,000 and R is selected from the group consisting of hydrogen, alkyl, aryl, alkylaryl, acetyl, heteroatoms, and mixtures thereof. In certain embodiments of the present invention wherein an aliphatic polyester is used, the aliphatic polyester may be poly(lactide). Poly (lactide) is synthesized either from lactic acid by a condensation reaction or, more commonly, by ring-opening polymerization of cyclic lactide monomer. Since both lactic acid and lactide can achieve the same repeating unit, the general term poly(lactic acid) as used herein refers to writ of formula I without any limitation as to how the polymer was made (e.g., from lactides, lactic acid, or oligomers), and without reference to the degree of polymerization or level of plasticization.

The lactide monomer exists generally in three different forms: two stereoisomers (L- and D-lactide) and racemic D,L-lactide (meso-lactide). The oligomers of lactic acid and the oligomers of lactide are defined by the formula:

Formula II where m is an integer in the range of from greater than or equal to about 2 to less than or equal to about 75. In certain embodiments, m may be an integer in the range of from greater than or equal to about 2 to less than or equal to about 10. These limits may correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications or uses of the present invention in which a slower degradation of the degradable material is desired. Poly(D,L-lactide) may be a more amorphous polymer with a resultant faster hydrolysis rate. This may be suitable for other applications or uses in which a more rapid degradation may be appropriate. The stereoisomers of lactic acid may be used individually, or may be combined in accordance with the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified by blending high and low molecular weight polylactide or by blending polylactide with other polyesters. In embodiments wherein polylactide is used as the degradable material, certain preferred embodiments employ a mixture of the D and L stereoisomers, designed so as to provide a desired degradation time and/or rate. Examples of suitable sources of degradable material are poly(lactic acids) that are commercially available from NatureWorks® of Minnetonka, Minn., under the trade names "3001D" and "4060D."

Aliphatic polyesters useful in the present invention may be prepared by substantially any of the conventionally known manufacturing methods such as those described in U.S. Pat. Nos. 6,323,307; 5,216,050; 4,387,769; 3,912,692; and 2,703,316, the relevant disclosures of which are incorporated herein by reference.

Polyanhydrides are another type of degradable polymer that may be suitable for use in the present invention. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

The physical properties of degradable polymers may depend on several factors including, but not limited to, the composition of the repeat units, flexibility of the chain, presence of polar groups, molecular mass, degree of branching, crystallinity, and orientation. For example, short chain branches may reduce the degree of crystallinity of polymers while long chain branches may lower the melt viscosity and may impart, inter alia, extensional viscosity with tension-stiffening behavior. The properties of the material utilized further may be tailored by blending, and copolymerizing it with another polymer, or by a change in the macromolecular architecture (e.g., hyper-branched polymers, star-shaped, or dendrimers, and the like). The properties of any such suitable degradable polymers (e.g., hydrophobicity, hydrophilicity, rate of degradation, and the like) can be tailored by introducing select functional groups along the polymer chains. For example, poly(phenyllactide) will degrade at about one-fifth of the rate of racemic poly(lactide) at a pH of 7.4 at 55° C. One of ordinary skill in the art, with the benefit of this disclosure, will be able to determine the appropriate functional groups to introduce to the polymer chains to achieve the desired physical properties of the degradable polymers.

In some embodiments, examples of suitable FLA may include degradable materials such as fatty alcohols, fatty esters, fatty acid salts, proteinous materials, or derivatives thereof. The melting points and solubilities in the following are from the HANDBOOK OF AQUEOUS SOLUBILITY DATA, by Samuel H. Yalkowsky and Yan He, Publisher: CRC Press, 2001 These materials may be used in any mixture or combination in the degradable diverting agents of the present invention. Fatty alcohols and fatty esters that may be suitable for use in the present invention include, but are not limited to montanyl alcohol (which has a melting point of 83° C. (171° F.)); tert-butylhydroquinone (which has a melting point of 128° C. (262° F.), and is insoluble in water); cholesterol (which has a melting point of 149° C. (300° F.), and has a solubility of 0.095 mg/L of water at 30° C. (86° F.)); cholesteryl nonanoate (which has a melting point of about 80° C. (176° F.), and is insoluble in water); benzoin (which has a melting point of about 137° C. (279° F.), and is slightly insoluble in water); borneol (which has a melting point of about 208° C. (406° F.), and is slightly insoluble in water); exo-norborneol (which has a melting point of 125° C. (257° F.) and; glyceraldehyde triphenylmethanol (which has a melting point of 164.2° C. (324° F.), and is insoluble in water; propyl gallate (which has a melting point of 150° C. (302° F.); and dimethyl terephthalate ("DMT") (which has a melting point of 141° C. (286° F.), and limited solubility in water which is more soluble than "slightly"). Any combinations, derivatives, or mixtures of these may be suitable as well. Suitable fatty alcohols may also include, as examples: camphor ($C_{10}H_{16}O$, with a melting point of about 180° C. (356° F.), slightly soluble in water); cholecalciferol (a.k.a. vitamin D3, $C_{27}H_{44}O$, with a melting point of about 85° C. (185° F.), slightly soluble in water); ricinolyl alcohol ($C_{18}H_{36}O_2$, with a melting point of about 89° C. (192° F.)); 1-heptacosanol ($C_{27}H_{56}O$, with a melting point of about 82° C. (180° F.)); 1-tetratriacontanol (a.k.a. geddyl alcohol $C_{34}H_{70}O$, with a melting point of about 92° C. (198° F.)); 1-dotriacontanol (lacceryl alcohol, $C_{32}H_{66}O$, with a melting point of about 89° C. (192° F.)); 1-hentriacontanol (melissyl alcohol, $C_{31}H_{64}O$, with a melting point of about 87° C. (189° F.)); 1-triacontanol (myricyl alcohol, $C_{30}H_{62}O$, with a melting point of about 87°

C. (189° F.)); 1-nonacosanol ($C_{29}H_{60}O$, with a melting point of about 85° C. (185° F.)); 1-octasanol (a.k.a. montanyl alcohol, $C_{28}H_{58}O$, with a melting point of about 84° C. (183° F.)); 1-hexacosanol (ceryl alcohol, $C_{26}H_{54}O$, with a melting point of about 81° C. (178° F.)); 1,14-tetradecanediol ($C_{14}H_{30}O_2$, with a melting point of about 85° C. (185° F.)); 1,16-hexadecanediol, ($C_{16}H_{34}O_2$, with a melting point of about 91° C. (196° F.)); 1,17-heptadecanediol ($C_{18}H_{36}O_2$, with a melting point of about 96° C. (205° F.)); 1,18-octadecanediol ($C_{19}H_{38}O_2$, with a melting point of about 98° C. (208° F.)); 1,19-nonadecanediol ($C_{20}H_{40}O_2$, with a melting point of about 101° C. (214° F.)); 1,20-eicosanediol ($C_{20}H_{42}O_2$ with a melting point of about 102° C. (216° F.)); 1,21-heneicosanediol ($C_{21}H_{44}O_2$, with a melting point of about 105° C. (221° F.)); and 1,22-docosanediol ($C_{22}H_{46}O_2$, with a melting point of about 106° C. (223° F.)). Any combinations, derivatives, or mixtures of these may be suitable as well. The described fatty esters are generally reaction products of alcohols and acids. Examples include, but are not limited to, prednisolone acetate ($C_{26}H_{36}O_6$, M.P. 233° C. (451° F.), slightly soluble in water), cellobiose tetraacetate (slightly soluble in water), terephthalic acid dimethyl ester, ($C_{10}H_{10}O_4$, M.P. 140° C. (284° F.), slightly soluble in water). Other examples of esters can be found in ester waxes such as carnauba wax and ouricouri wax. Carnauba wax comprises ceryl palmitate, myricyl ceretate, and myricyl alcohol ($C_{30}H_{61}OH$) along with other high molecular weight esters and alcohols. Olho wax is a pure whitish gray carnauba wax obtained from young leaves. Other waxes that can be used include the following. Refined olho wax is also known as flora wax. Palha wax is a brownish wax obtained from older leaves. Palha wax can be emulsified with water to form chalky wax. Castor wax is a compound obtained by the controlled hydrogenation of pure castor oil. The principle constituent is glycerol tris 12-hydroxystearate, also known as opalwax with a melting point in the range from about 78° C. (172° F.) to about 85° C. (185° F.). Any combinations, derivatives, or mixtures of these may be suitable as well. Suitable proteinous materials may also be used in the present invention. The term "proteinous materials", as used herein, relates to any of a group of complex organic macromolecules that contain carbon, hydrogen, oxygen, nitrogen, and/or sulfur and are composed of one or more chains of amino acids. Prolamins are a group of plant storage proteins having a high proline and glutamine content and can be found in the seeds of cereal grains. The prolamins that are suitable for use in the degradable diverting agents of the present invention include, but are not limited to, such prolamins as: gliadin, hordein, secalin, zein, avenin, and combinations thereof. Prolamins are generally soluble only in strong alcohol solutions and have a melting point in the range from about 160° C. (320° F.) to about 200° C. (392° F.). Fatty acid salts that may be suitable for use in the present invention include, but are not limited to, such fatty acid salts as: sucrose distearate, calcium stearate, glyceryl monostearate, zinc stearate and magnesium stearate which is a hydrophobic substance with a melting point of 88° C. (190° F.). Additional information concerning degradable materials which are suitable FLA may be found in co-pending U.S. Patent Publication No. 2011/0005761, entitled "Degradable Diverting Agents and Associated Methods," to Luo et al., which is filed on the same day herewith on Jul. 13, 2009, and which is herein incorporated by reference in its entirety.

Suitable FLAs may also include, by non-limiting example, water-soluble polymers, or crosslinked water-soluble polymers. In certain embodiment, suitable water-soluble polymers include relative permeability modifiers. In general, suitable relative permeability modifiers may be any of a variety of compounds that are capable of selectively reducing the effective permeability of a formation to water-based fluids without a comparable reduction of the formation's effective permeability to hydrocarbons. Suitable relative permeability modifiers generally include water-soluble polymers that attach to surfaces within the formation, reducing the water permeability without a comparable reduction in hydrocarbon permeability. As used in this disclosure, "water soluble" refers to at least about 0.01 weight percent soluble in distilled water at room temperature (about 72° F.). In certain embodiments, the water-soluble polymer is at least about 0.45 weight percent soluble in distilled water at room temperature. In certain embodiments, the water-soluble polymer is at least about 0.6 weight percent soluble in distilled water at room temperature.

Those of ordinary skill in the art, with the benefit of this disclosure, will appreciate that a variety of different water-soluble polymers may be suitable for use as the relative permeability modifiers. Examples of suitable water-soluble polymers include, but are not limited to, homo-, co-, and terpolymers of acrylamide, 2-acrylamido-2-methyl propane sulfonic acid, N,N-dimethylacrylamide, vinyl pyrrolidone, dimethylaaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, quaternary salt derivatives of acrylic acid, and combinations thereof.

In addition, water-soluble polymers suitable for use as relative permeability modifiers also may include hydrophobically modified polymers. As used in this disclosure, the terms "hydrophobically modified," "hydrophobic modification," and the like refer to the incorporation into the hydrophilic polymer structure of hydrophobic groups, wherein the alkyl chain length is about 4 to about 22 carbons. While these hydrophobically modified polymers have hydrophobic groups incorporated into the hydrophilic polymer structure, they should remain water soluble. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone that comprises polar heteroatoms. Generally, the polar heteroatoms present within the polymer backbone of the hydrophobically modified polymers include, but are not limited to, oxygen, nitrogen, sulfur, or phosphorous.

Example hydrophobically modified polymers may contain a hydrophilic polymer backbone and a hydrophobic branch, wherein the hydrophobic branch includes an alkyl chain of about 4 to about 22 carbons. In certain embodiments, the hydrophobic branch may have an alkyl chain length of about 7 to about 22 carbons. In certain embodiments, the hydrophobic branch may have an alkyl chain length of about 12 to about 18 carbons.

Additional examples of suitable hydrophobically modified polymers include a polymer that has been hydrophobically modified with an alkyl group present on an amino group (in the polymer backbone or as a pendant group) in quaternized form. For example, an alkyl group may be present on a dialkyl amino pendant group in quaternized form. In one embodiment, the dialkyl amino pendant group comprises a dimethyl amino pendant group. One specific example of a hydrophobically modified polymer includes a polydimethylaminoethylmethacrylate or polydimethylaminopropylmethacrylamide that has been hydrophobically modified with an alkyl group with 4 carbons to 22 carbons (e.g., 4 carbons, 6 carbons, 8 carbons, 10 carbons, 12 carbons, 14 carbons, 16 carbons, 18 carbons, 20 carbons, 22 carbons, etc.) on a dimethylamino group. An example of a suitable hydrophobically modified polymer is HPT-1™, available from Halliburton Energy Services, Inc., Duncan, Okla.

Suitable FLAs also may include particulate solids. Examples of suitable particulate solids include, but are not limited to, magnesia, aluminum hydroxide, calcium carbonate (calcite), calcium oxalate, calcium phosphate, aluminum metaphosphate, sodium zinc potassium polyphosphate ceramic, sodium calcium magnesium polyphosphate ceramic, chemically bonded ceramics, chemical cements, asbestos, granular starch, particulate mica, plastic particles, solid wax or wax-polymer particles, solid oil-soluble resin particles, insoluble salts, slowly soluble salts (such as sodium chloride if the carrier fluid and formation water have high ionic strengths), salts where solubility is highly dependent on pH (such as calcium citrate, lactides, anhydrides, benzoic acid, lactones), and mixtures thereof. An example of a suitable particulate solid is BioVert™ H150 Diverter available from Halliburton Energy Services, Duncan, Okla. In certain embodiments, the particulate solid may comprise a degradable polymer. Examples of suitable degradable polymers include, but are not limited to, poly(orthoesters); aliphatic polyesters (e.g., polylactic acid); poly(lactides); poly(glycolides); poly(ε-caprolactone); poly(hydroxybutyrate); poly(anhydrides); and poly(amino acids), and polymers suitable among other things, to chemical and/or radical process such as hydrolysis, oxidation, or enzymatic decomposition. The degradability of a polymer depends at least in part on its backbone structure, type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, for example, temperature, presence of moisture, oxygen, microorganisms, enzymes, pH, and the like.

The amount of the FLA to include in the pad fluid depends a number of factors, including the desired leakoff parameters and the particular FLA chosen, among others. By way of example, the FLA may be present in the pad fluid in an amount of about 0.5% to about 15% by weight of the pad fluid and, more particularly, in an amount of about 0.75% to about 5% by weight.

A variety of viscosifying agents may be used in conjunction with the pad fluids, including, but not limited to, viscoelastic surfactants, biopolymers, and/or synthetic polymers. As used herein the term "viscosifying agent" refers to any agent that increases the viscosity of a fluid. By way of example, a viscoelastic surfactant may be utilized to prepare a surfactant gel wherein association of the surfactants to form micelles or specialized or larger associates structures (e.g., wormlike structures) increase the viscosity of the pad fluid. In addition, the polymers or synthetic polymers may be utilized to prepare a linear gel. The viscosifying agents may serve to increase the viscosity of the pad fluid. Examples of suitable viscoelastic surfactants include, but are not limited to, anionic surfactants such as alkyl sarcosinate, cationic surfactants such as fatty amine salts or N-erucyl-M,N-bis(2-hydroxyethyl)-N-methyl ammonium chloride, zwitterionic surfactants such as erucylamidopropyl betaine amine, non-ionic surfactants such as amidoamine oxides, amine oxides, and combinations thereof. Examples of suitable polymers include polymers comprising natural, modified and derivatized polysaccharides, and derivatives thereof, which contain one or more of these monosaccharide units: galactose, mannose, glucoside, glucose, xylose, arabinose, fructose, glucuronic acid, or pyranosyl sulfate. Additional examples of suitable polymers include, but are not limited to, guar, hydroxypropyl guar, carboxymethyl guar, carboxymethylhydroxypropyl guar, other derivatives of guar gum, xanthan, galactomannan gums, cellulose, hydroxyethylcellulose, carboxymethylcellulose, succinoglycan, and/or other cellulose derivatives. Examples of suitable synthetic polymers include, but are not limited to, polyacrylate, polymethacrylate, polyacrylamide, polyvinyl alcohol, and polyvinylpyrrolidone.

Typically, the amount of a viscosifying agent that may be included in a pad fluid depends on the viscosity desired. Thus, the amount to include may be an amount effective to achieve a desired viscosity effect. In certain embodiments, the viscosifying agent may be present in the pad fluid in an amount of about 0.1% to about 10% by weight of the pad fluid and, alternatively, in an amount of from about 0.1% to about 2% by weight of the pad fluid. One skilled in the art with the benefit of this disclosure will recognize the appropriate viscosifying agent and amount of the viscosifying agent to use for a particular application.

Optionally, the pad fluid may contain a variety of additional additives that may be suitable for use in hydraulic-fracturing treatment. Examples of such additives include, but are not limited to, gelling agents, foam control agents, oxidizing agents, lost circulation materials, surfactants, clay stabilizers, penetrating agents, buffers, acids, bases, clay control additives, breakers, breaker activators, anti-sludging, delayed release acids, scale inhibitors, corrosion inhibitors, friction reducers, enzymes, catalysts, solvents, iron control additives, paraffin and asphaltene control additives, bactericides, fines stabilization additives, oxygen scavengers, sulfide scavengers, emulsifiers, foamers, gases, sand consolidation chemicals, tackifiers, proppant flow back control additives, free radical generators, chelating agents, mutual solvents, derivatives thereof and combinations thereof, and the like.

Slurry fluids of the present invention may generally comprise a base fluid, a viscosifying agent, and proppant particulates. Acceptable slurry fluids may be any fluid which exhibits both high leakoff characteristics and proppant transport ability. It should be understood by those of ordinary skill in the art that a test for high leakoff characteristics would be to flow the fluid through a permeable medium, seeking a near steady-state result over extended time intervals. Such acceptable slurry fluids may include clean biopolymers, surfactant gels, viscoelastic surfactants ("VES"), and linear gels. In general, the slurry fluid may be formulated to be a high-leakoff fluid. In addition, the slurry fluid may be formulated such that it does not disrupt the barrier (e.g., the filter cake) during its introduction into the fracture. Accordingly, the barrier may remain substantially impermeable to aqueous fluids during introduction of the slurry fluid into the fracture.

The slurry fluid may contain a base fluid as a medium of transport for the other components of the fluid and/or proppant particulates into the formation. The base fluid may comprise water or brine. Selected organic or inorganic salts or mixtures may be included, provided that they do not undesirably interact with other components in the pad, other treatment fluids, the formation, and formation fluids. For example, a base fluid comprising about 1% to about 7% by weight potassium chloride or ammonium chloride may be used as the base fluid in pad fluids to stabilize clays and prevent clay swelling. Sometimes other brines or seawater may be used.

An organic cation salt, such as, in particular, tetra methyl ammonium chloride, may be utilized, with a concentration of, for example, but not limited to, about 0.2% to about 0.5% by weight.

In addition, the slurry fluid may further comprise a viscosifying agent in accordance with embodiments of the present invention. By way of example, a viscosifying agent may be used in a slurry fluid to impart a sufficient carrying capacity and/or thixotropy to the slurry fluid, enabling the slurry fluid to transport proppant particulates and/or preventing the undesired settling of the proppant particulates.

A variety of viscosifying agents may be used in conjunction with the slurry fluids, including, but not limited to, VES, bipolymers, and/or synthetic polymers. By way of example, VES may be utilized to prepare a surfactant gel, wherein association of the surfactants to form micelles or specialized or larger associates structures (e.g., wormlike structures) increases the viscosity of the slurry fluid. In addition, biolymers or synthetic polymers may be utilized to prepare a linear gel. The viscosifying agents may serve to increase the viscosity of the slurry fluid. Examples of suitable viscoelastic surfactants include, but are not limited to, anionic surfactants such as alkyl sarcosinate, cationic surfactants such as fatty amine salts or N-erucyl-M,N-bis(2-hydroxyethyl)-N-methyl ammonium chloride, zwitterionic surfactants such as erucylamidopropyl betaine amine, non-ionic surfactants such as amidoamine oxides, amine oxides, and combinations thereof. Examples of suitable biopolymers comprising natural, modified and derivatized polysaccharides, and derivatives thereof, which contain one or more of these monosaccharide units: galactose, mannose, glucoside, glucose, xylose, arabinose, fructose, glucuronic acid, or pyranosyl sulfate. Additional examples of suitable biopolymers include, but are not limited to, guar, hydroxypropyl guar, carboxymethyl guar, carboxymethylhydroxypropyl guar, other derivatives of guar gum, xanthan, galactomannan gums, cellulose, hydroxyethylcellulose, carboxymethylcellulose, succinoglycan, and/or other cellulose derivatives. Examples of suitable synthetic polymers include, but are not limited to, polyacrylate, polymethacrylate, polyacrylamide, polyvinyl alcohol, and polyvinylpyrrolidone.

Typically, the amount of a viscosifying agent that may be included in a slurry fluid depends on the viscosity desired. Thus, the amount to include may be an amount effective to achieve a desired viscosity effect. In certain embodiments, the viscosifying agent may be present in the slurry fluid in an amount of about 0.1% to about 10% by weight of the slurry fluid and, alternatively, in an amount of from about 0.1% to about 2% by weight of the slurry fluid. One skilled in the art with the benefit of this disclosure will recognize the appropriate viscosifying agent and amount of the viscosifying agent to use for a particular application.

A variety of different proppant particulates may be utilized in accordance with embodiments of the present invention. In general, any type of proppant particulate may be used, provided that it does not undesirably interact with the formation, the fluids, and the desired results of the treatment. Such proppant particulates may be natural or synthetic, coated, or contain chemicals; more than one may be used sequentially or in mixtures of different sizes or different materials. Examples of suitable proppant materials include sand, resin coated sand, bauxite, particulate ceramics, glass microspheres, sintered bauxite, polymer materials, synthetic organic beads such as styrene-divinylbenzene copolymer beads, TEFLON® (polytetrafluoroethylene) materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. The mean particulate size generally may range from about 2 mesh to about 400 mesh on the U.S. Sieve Series; however, in certain circumstances, other mean particulate sizes may be desired and will be entirely suitable for practice of the present invention. Mean particulates size distribution ranges may be one or more of 6/12, 8/16, 12/20, 16/30, 20/40, 30/50, 40/60, 40/70, or 50/70 mesh sized materials.

The concentration of proppant particulates in the slurry fluid may vary over time. For example, the slurry fluid may be pumped into the fracture in two or more stages, wherein each stage may have a lower concentration of proppant particulates than the next subsequent stage. In certain embodiments, the particulates may be present in the slurry fluids of the present invention in an amount in the range of from about 0.25 pounds per gallon ("ppg") to about 30 ppg by volume of the slurry fluid.

The slurry fluids may further comprise additional additives as deemed appropriate by one of ordinary skill in the art, with the benefit of this disclosure. Examples of such additives include, but are not limited to, gelling agents, foam control agents, oxidizing agents, lost circulation materials, surfactants, clay stabilizers, penetrating agents, buffers, acids, bases, clay control additives, breakers, breaker activators, anti-sludging, delayed release acids, scale inhibitors, corrosion inhibitors, friction reduces, enzymes, catalysts, solvents, iron control additives, paraffin and asphaltene control additives, bactericides, fines stabilization additives, oxygen scavengers, sulfide scavengers, emulsifiers, foamers, gases, sand consolidation chemicals, tackifiers, proppant flow back control additives, free radical generators, chelating agents, mutual solvents, derivatives thereof and combinations thereof, and the like.

To facilitate a better understanding of the present invention, the following examples of certain aspects of some embodiments are given. In no way should the following examples be read to limit, or define, the entire scope of the invention.

EXAMPLE

An extrusion test was performed to evaluate leakoff behavior of an example pad fluid that comprised tap water, 40 pounds per thousand gallons of a xanthan gelling agent, and 50 pounds per thousand gallons of BioVert™ fluid loss agent.

Figure 8:
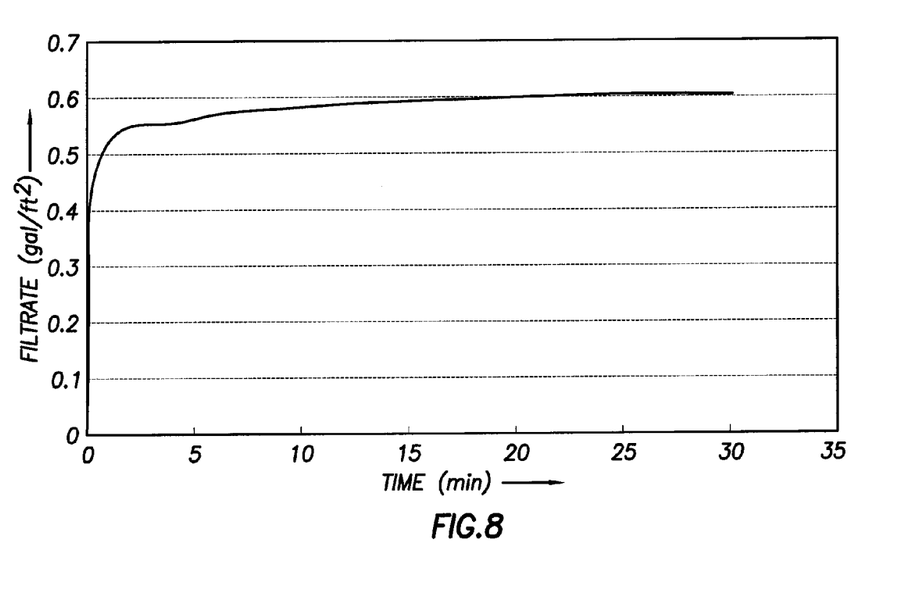
FIG. 8 illustrates leakoff behavior of an example pad fluid in accordance with an aspect of the invention.

For this extrusion test, the test apparatus comprised a "Fann® Instrument Company's HPHT Filter Press 500 ml" having full opening valves on the inlet and exit ports. The bottom end cap of the HPHT cell had circumferential grooves to permit flow through a core sample to communicate with the exit port. A 5-micron Aloxite disk was fixed in the bottom of the test cell on top of the bottom end cap. The disk had a surface area of about 0.03 ft$^2$. The cell was mounted vertically and filled with the example pad fluid. The example pad fluid was allowed to age for about 2 hours in the test cell at about 140° F., and a 500 psi nitrogen gas source was connected to the inlet port of the HPHT cell. To begin the test, the top valve was opened to allow the 500 psi nitrogen gas pressure to be applied to the fluid in the cell to create a 500 psi differential, and then the bottom valve was opened to begin the fluid loss test. The time was monitored, and any fluid caused to be extruded through the Aloxite disk was collected and measured. The results of the test are set forth in FIG. 8. The example pad fluid has a very high initial spurt rate at greater than 10 gal/ft$^2$/hr, a spurt volume of less than 5 gal/ft$^2$, and a post-spurt rate of less than 0.2 gal/ft$^2$/hr.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   selecting a target fracture geometry for a portion of a subterranean formation;
   introducing a pad fluid comprising a fluid-loss-control additive into the subterranean formation to create or extend one or more fractures in the portion of the subterranean formation, wherein an amount of the fluid-loss-control additive is determined based at least in part on the target fracture geometry;
   allowing a barrier to form along at least a portion of the one or more fractures, wherein the barrier comprises the fluid-loss-control additive; and
   introducing a slurry fluid comprising proppant particulates into the one or more fractures, wherein a tip screen-out occurs in at least one of the one or more fractures.

2. The method of claim 1, wherein the portion of the subterranean formation is a high-permeability subterranean formation.

3. The method of claim 1, wherein the fluid-loss-control additive comprises at least one material selected from the group consisting of: a breakable material, a degradable material, a dissolvable material, a water-soluble polymer, a particulate solid, and any derivative thereof.

4. The method of claim 1, wherein the fluid-loss-control additive comprises at least one degradable material selected from the group consisting of: a poly(lactide); a poly(glycolide); a poly(ε-caprolactone); a poly(hydroxy ester ether); a poly(hydroxybutyrate); a poly(anhydride); a polycarbonate; a poly(orthoester); a poly(amino acid); a poly(ethylene oxide); a poly(phosphazene); a poly ether ester; a polyester amide; a polyamide; a poly(lactic acid), a poly(anhydride), a poly(orthoester), a poly(lactide)-co-poly(glycolide)copolymer; a fatty alcohol, a fatty ester, a fatty acid salt, a proteinous material, and any derivative thereof.

5. The method of claim 1, wherein the barrier comprises a filter cake that is substantially impermeable to aqueous fluids.

6. The method of claim 1, wherein the barrier permits post-spurt fluid loss of less than about 0.2 gal/ft2/hr.

7. The method of claim 1, wherein the slurry fluid comprises a high-leakoff fluid.

8. The method of claim 1, wherein the rate of introduction of the slurry fluid is less than about 10 barrels/minute.

9. The method of claim 1, wherein the barrier does not substantially degrade until after introduction of the slurry fluid into the one or more fractures.

10. The method of claim 1, wherein the step of introducing the pad fluid comprises multiple stages of pad fluids.

11. The method of claim 1, wherein the step of introducing the slurry fluid comprises multiple stages of slurry fluids.

12. A method comprising:
    selecting a target fracture geometry for a portion of a subterranean formation;
    selecting a target tip pressure and a target back flow pressure based at least in part on a calculation for the target fracture geometry;
    selecting a target surface pressure and a target bottom-hole pressure based at least in part on a calculation for the target tip pressure and the target back flow pressure; and
    introducing a slurry fluid comprising proppant particulates into one or more fractures in the portion of the subterranean formation, wherein surface pressure corresponds to the target surface pressure, and bottom-hole pressure corresponds to the target bottom-hole pressure.

13. The method of claim 12, wherein a tip screen-out occurs in at least one of the one or more fractures.

14. The method of claim 12, further comprising:
    introducing a pad fluid comprising a fluid-loss-control additive into the portion of the subterranean formation, wherein the fluid-loss-control additive forms a barrier along at least a portion of the one or more fractures.

15. The method of claim 14, wherein the fluid-loss-control additive comprises at least one material selected from the group consisting of: a breakable material, a degradable material, a dissolvable material, a water-soluble polymer, a particulate solid, and any derivative thereof.

16. The method of claim 14, wherein the barrier permits post-spurt fluid loss of less than about 0.2 gal/ft2/hr.

17. The method of claim 14, wherein the slurry fluid does not disrupt the barrier during introduction of the slurry fluid into the one or more fractures.

18. The method of claim 14, wherein the barrier does not substantially degrade until after introduction of the slurry fluid into the one or more fractures.

19. The method of claim 12, wherein the slurry fluid comprises a high-leakoff fluid.

20. A method comprising:
- selecting a target fracture geometry for a portion of a subterranean formation;
- selecting a target barrier coverage based at least in part on a calculation for the target fracture geometry;
- selecting target pad fluid parameters based at least in part on a calculation for the target barrier coverage, wherein the target pad fluid parameters comprise a target volume of pad fluid, a target quantity of fluid-loss-control additive within the pad fluid, and a target pumping rate and pressure to pump the pad fluid;
- introducing a pad fluid into the portion of the subterranean formation, wherein volume of pad fluid, quantity of fluid-loss-control additive within the pad fluid, and pumping rate and pressure to pump the pad fluid correspond to the target pad fluid parameters;
- selecting target slurry fluid parameters based at least in part on a calculation for the target barrier coverage and target fracture geometry, wherein the target slurry fluid parameters comprise a target volume of slurry fluid, a target quantity of proppant within the slurry fluid, a target viscosity of the slurry fluid, and a target pumping rate and pressure to pump the slurry fluid; and
- introducing a slurry fluid into the portion of the subterranean formation, wherein volume of slurry fluid, quantity of proppant within the slurry fluid, viscosity of the slurry fluid, and pumping rate and pressure to pump the slurry fluid correspond to the target slurry fluid parameters.

* * * * *